(12) United States Patent
Nakashima et al.

(10) Patent No.: US 7,680,419 B2
(45) Date of Patent: Mar. 16, 2010

(54) REPEATER AND REPEATING METHOD

(75) Inventors: Hisao Nakashima, Kawasaki (JP); Takeshi Hoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 837 days.

(21) Appl. No.: 11/445,148

(22) Filed: Jun. 2, 2006

(65) Prior Publication Data

US 2007/0201878 A1 Aug. 30, 2007

(30) Foreign Application Priority Data

Feb. 28, 2006 (JP) .............................. 2006-053228

(51) Int. Cl.
*H04B 10/00* (2006.01)

(52) U.S. Cl. ........................ 398/177; 398/11; 398/18; 398/37; 398/62; 398/97; 398/126; 398/173

(58) Field of Classification Search .................. 398/6, 398/11, 18, 37, 62, 64, 97, 105, 126, 173–181
See application file for complete search history.

(56) References Cited

U.S. PATENT DOCUMENTS

| | | | | |
|---|---|---|---|---|
| 4,501,022 | A * | 2/1985 | Oswald | 398/175 |
| 5,917,625 | A * | 6/1999 | Ogusu et al. | 385/24 |
| 6,160,649 | A * | 12/2000 | Horiuchi et al. | 398/34 |
| 6,256,125 | B1 * | 7/2001 | Uehara | 398/79 |
| 6,657,778 | B1 * | 12/2003 | Motoshima et al. | 359/337.1 |
| 6,704,513 | B1 * | 3/2004 | Goossen | 398/94 |
| 6,832,052 | B1 * | 12/2004 | Marmur | 398/175 |
| 7,248,799 | B2 * | 7/2007 | Faure et al. | 398/38 |
| 2002/0024723 | A1 * | 2/2002 | Sekiya et al. | 359/337.1 |
| 2002/0051424 | A1 * | 5/2002 | Krishnamoorthy et al. | 370/204 |
| 2002/0080447 | A1 * | 6/2002 | Fells et al. | 359/141 |
| 2002/0154359 | A1 * | 10/2002 | Tsuda et al. | 359/124 |
| 2004/0086279 | A1 * | 5/2004 | Sakamoto et al. | 398/177 |
| 2004/0120640 | A1 * | 6/2004 | Hatayama et al. | 385/27 |
| 2004/0190899 | A1 * | 9/2004 | Torii et al. | 398/33 |
| 2005/0013610 | A1 * | 1/2005 | Evangelides et al. | 398/33 |
| 2005/0249303 | A1 * | 11/2005 | Takano | 375/267 |
| 2005/0276563 | A1 * | 12/2005 | Faure et al. | 385/140 |
| 2006/0018258 | A1 * | 1/2006 | Teague et al. | 370/236 |
| 2006/0040616 | A1 * | 2/2006 | Wheatley | 455/67.11 |

OTHER PUBLICATIONS

K. Nakamura, et al., "1.28 Tbit/s Transmission over 1680 km Standard SMF with 120 km Optical Spacing Employing Distributed Raman Amplification", Fifth Optoelectronic and Communication Conference (OECC 2000) Technical Digest, Jul. 2000, pp. 14-15.

* cited by examiner

*Primary Examiner*—Ken N Vanderpuye
*Assistant Examiner*—Tanya Ngo

(57) ABSTRACT

A repeater is disclosed that transmits an optical signal using wave division multiplexing. The repeater includes a demultiplexing unit that separates plural channels contained in the optical signal, an adjusting unit that adjusts at least optical power of each of the channels according to a control signal, a multiplexing unit that outputs a multiple wavelength signal in which the channels are multiplexed, and a monitoring unit that determines a modulation scheme and a bit rate of the optical signal for each of the channels so as to generate the control signal.

11 Claims, 8 Drawing Sheets

FIG.6

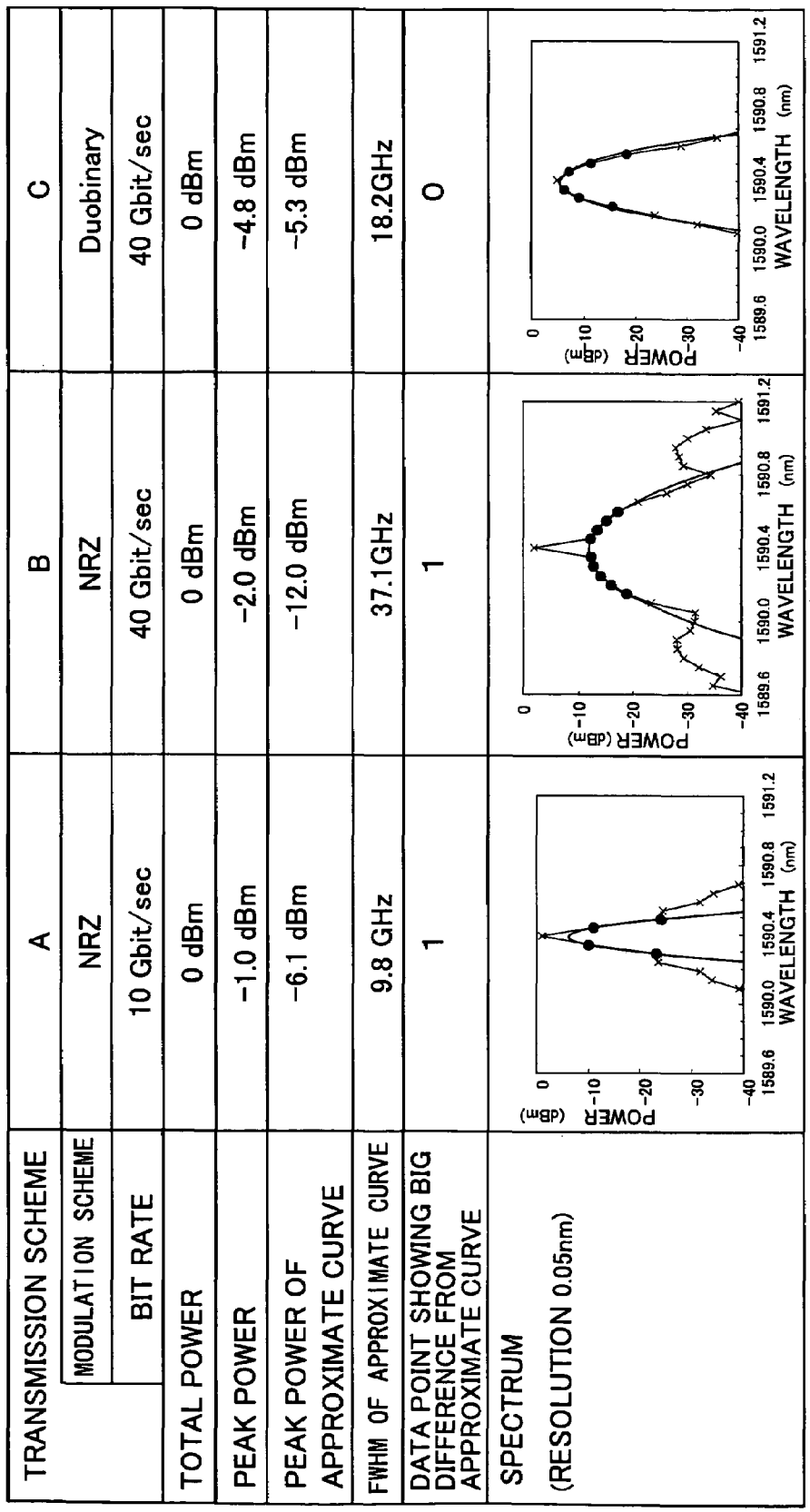

| TRANSMISSION SCHEME | | A | B | C |
|---|---|---|---|---|
| | MODULATION SCHEME | NRZ | NRZ | Duobinary |
| | BIT RATE | 10 Gbit/sec | 40 Gbit/sec | 40 Gbit/sec |
| TOTAL POWER | | 0 dBm | 0 dBm | 0 dBm |
| PEAK POWER | | -1.0 dBm | -2.0 dBm | -4.8 dBm |
| PEAK POWER OF APPROXIMATE CURVE | | -6.1 dBm | -12.0 dBm | -5.3 dBm |
| FWHM OF APPROXIMATE CURVE | | 9.8 GHz | 37.1 GHz | 18.2 GHz |
| DATA POINT SHOWING BIG DIFFERENCE FROM APPROXIMATE CURVE | | 1 | 1 | 0 |
| SPECTRUM (RESOLUTION 0.05nm) | | | | |

*Approximate Curve: Curve fitting to measured spectrum data excluding data of maximum optical power. Fitting function is quadratic curve.

| TRANSMISSION SCHEME | PEAK (dBm) |
|---|---|
| A | −1.0 |
| B | −2.0 |
| C | −4.8 |
| D | −8.9 |
| E | −7.1 |
| F | −5.3 |

REPEATER AND REPEATING METHOD

BACKGROUND OF THE INVENTION

1. Field of the Invention

The present invention generally relates to optical communication technology, and particularly relates to a repeater and a repeating method for a WDM (Wavelength Division Multiplexing) optical communication system.

2. Description of the Related Art

In the technical field of optical communications, there have been growing demands for a wider variety of services and higher speed data transmission. In these years, multiple wavelength optical transmission systems of a transmission speed higher than 40 Gbps per wave are coming closer to realization. Unlike recently popular optical signal transmission of about 10 Gbps, a standard scheme for high-speed optical signal transmission such as 40 Gbps has not yet been determined. In high-speed optical signal transmission of 10 Gbps- or higher, not only is signal quality lowered due to optical noise in optical amplifiers, but optical signal properties are also lowered due to wavelength dispersion, nonlinear effects, polarization mode dispersion, spectrum narrowing by optical filters, etc., in transmission lines. In view of these problems, modulation schemes for narrow spectral width that improve dispersion tolerance, nonlinear tolerance, etc., are being researched and developed. Especially, for multiple wavelength optical transmission systems of 40 Gbps, not only systems using NRZ but also systems using modulation schemes such as CSRZ, DPSK, and DQPSK are being proposed. Thus, systems using various transmission schemes are expected to be introduced in the future. The recently popular WDM transmission systems of 10 Gbps are presented in, for example, Non-patent Document 1.

<Non-Patent Document 1> K. Nakamura et al., "1.28 Tbit/s Transmission over 1680 km Standard SMF with 120 km Optical Repeater Spacing Employing Distributed Raman Amplification", OECC2000, PD1-7

If optical signal transmission schemes differ, properties of optical signals such as noise tolerance, dispersion tolerance, and nonlinear tolerance also differ. This indicates that different transmission schemes require different compensation systems. A direct method for transmitting optical signals of different transmission schemes is to prepare a transmission line (optical fiber) for each transmission scheme so as to build an optical transmission system for each transmission scheme. For example, a transmission system dedicated for optical signals of 10 Gbps and a transmission system dedicated for optical signals of 40 Gbps are separately prepared and separately managed. However, devices for performing optical amplification, optical dispersion compensation and the like for the optical signals of 40 Gbps are expensive. Moreover, a demand for high-speed transmission services of 40 Gbps as high as a demand for the popular optical transmission services of 10 Gbps might not be expected. If the demand for services of the dedicated system is low, unit costs may be further increased.

Problems of facility investment and high costs may be solved by allocating some of the channels of the WDM transmission system of 10 Gbps (e.g. five channels out of forty channels in total) as channels for 40 Gbps. However, there is no established technique for making appropriate adjustments, in repeater devices provided on a transmission line, on channels of different transmission schemes propagating in physically the same transmission line.

SUMMARY OF THE INVENTION

The present invention may solve one or more of the above problems. The present invention is directed to provide a repeater and a repeating method for transmitting optical signals of different transmission schemes such as modulations schemes and bit rates using wavelength multiplexing.

In one embodiment of the present invention, there is provided a repeater that transmits an optical signal using wave division multiplexing. The repeater comprises a demultiplexing unit that separates plural channels contained in the optical signal, an adjusting unit that adjusts at least optical power of each of the channels according to a control signal, a multiplexing unit that outputs a multiple wavelength signal in which the channels are multiplexed, and a monitoring unit that determines a modulation scheme and a bit rate of the optical signal for each of the channels so as to generate the control signal.

According to an aspect of the present invention, optical signals of different transmission schemes such as modulations schemes and bit rates can be properly transmitted using wavelength multiplexing.

BRIEF DESCRIPTION OF THE DRAWINGS

FIGS. 6 and 7 provide a table showing spectrum characteristics of transmission schemes;

DETAILED DESCRIPTION OF THE PREFERRED EMBODIMENT

In one embodiment of the present invention, a modulation scheme and a bit rate of an optical signal being transmitted using WDM are identified for each channel so as to generate a control signal. According to this control signal, at least optical power of each channel is adjusted. A mechanism for monitoring a modulation scheme and a bit rate and feeding back the monitored result to system control is provided. Therefore, even if channels of different transmission schemes are present in the same transmission line, properties of each channel can be properly adjusted. The transmission scheme of each channel is identified by monitoring a spectrum of the optical signal and measuring peak power and spectral width, so that adjustments on signal properties suitable for each channel can be determined. Accordingly, even in a WDM system using various transmission schemes, accurate pre-emphasis and gain equalization can be performed.

The signal properties may be adjusted by attenuating optical power. This adjustment can prevent introduction of different levels of noise into the individual channels.

A unit for making adjustments may include a wavelength selection switching unit for selecting an optical channel according to a control signal and a unit for performing dispersion compensation on the optical channel selected by the wavelength selection switching unit. With this configuration, predetermined dispersion compensation can be performed on a wavelength (channel) of a predetermined transmission scheme.

In another embodiment of the present invention, peaks of an optical signal are detected, and an approximate waveform representing the optical signal with the peaks removed is calculated. A waveform with the peaks and the approximate waveform may be compared so as to determine a candidate for the modulation scheme and a candidate for the bit rate of each channel. This allows easily determining whether the channel to be measured has a sharp peak.

The approximate waveform may be represented by a curve with a single extremum in a predetermined wavelength range. The waveform may be represented by a quadratic curve. Accordingly, the waveform can be easily approximated.

Spectral widths of the optical signal may be measured so as to determine a candidate for the modulation scheme and a candidate for the bit rate of each channel. This allows finding the candidate for, especially, the bit rate of the channel to be measured.

Relationships between the modulation schemes, the bit rates, peak values, and optical power integration values may be stored in a memory unit. The relationships may be referred to so as to determine the transmission scheme of each channel, and a control signal for the determined transmission scheme may be generated.

Embodiment 1

Figure 1:
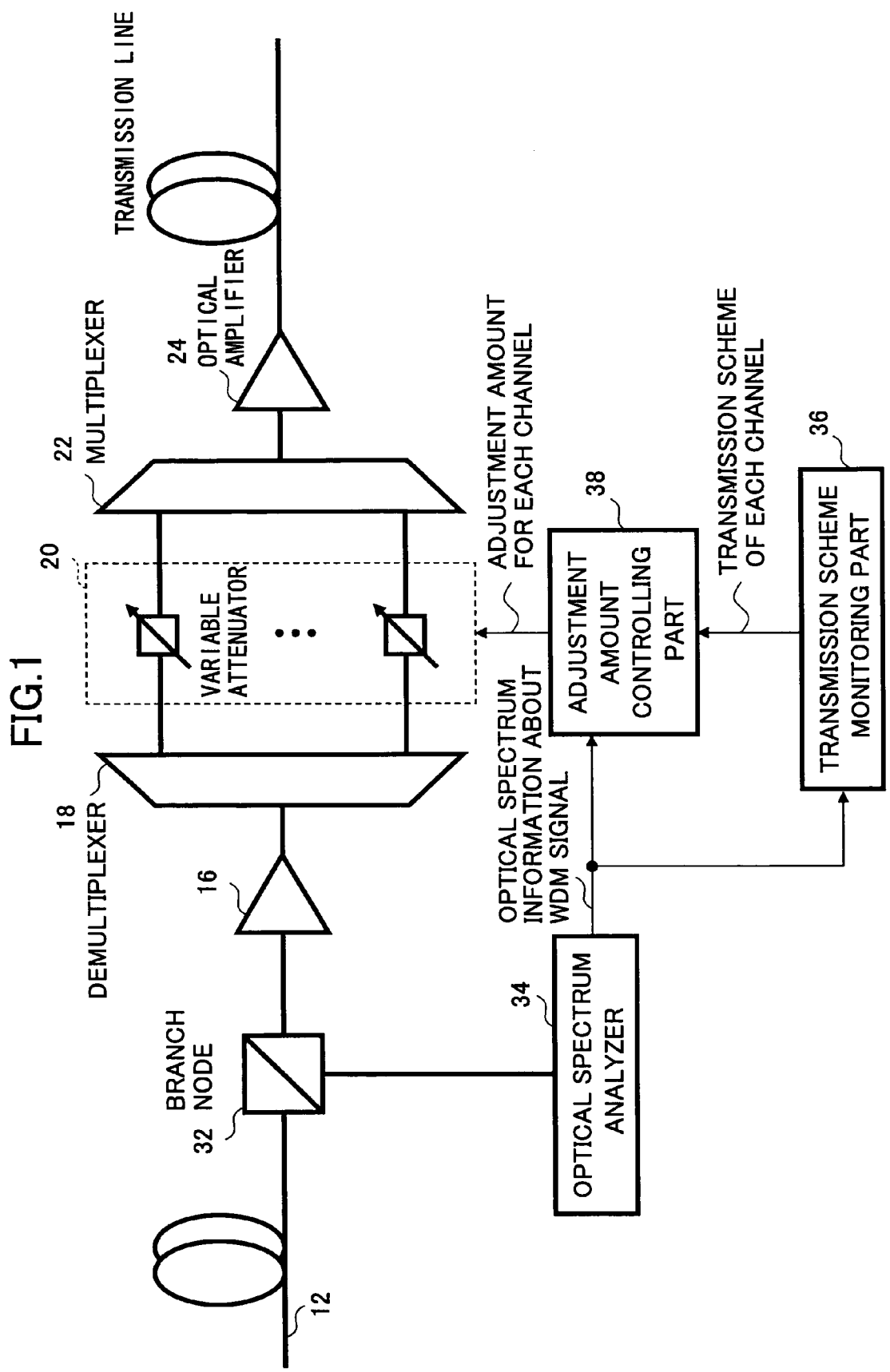
FIG. 1 is a block diagram showing a repeater according to an embodiment of the present invention.

FIG. 1 is a block diagram showing a repeater according to an embodiment of the present invention. FIG. 1 shows a transmission line 12, optical amplifiers 16 and 24, a demultiplexer 18, an adjusting part 20, a multiplexer 22, a branch node 32, an optical spectrum analyzer 34, a transmission scheme monitoring part 36, and an adjustment amount controlling part 38.

The transmission line 12 comprises an optical fiber and may transmit, for example, forty different wavelengths (forty channels) with the WDM scheme. The transmission schemes (including at least modulation scheme and bit rate) of the channels to be transmitted may be the same or different from each other. The number of channels is merely an example and may vary.

The optical amplifiers 16 and 24 amplify optical power of all the wavelengths (channels) propagating through the transmission line 12.

The demultiplexer 18 separates the channels contained in an optical signal input from an end thereof, and outputs the separated channels from the other end thereof in parallel.

The adjusting part 20 makes some adjustments related to transmission properties on each of the channels output from the demultiplexer 18. The typical transmission property to be adjusted is optical power level. Adjustment of the optical power level is performed by variable attenuators as shown in FIG. 1. From the viewpoint of adjustment of the optical power level, adjustment may be amplification or attenuation. However, for adjusting the optical power level while preventing introduction of different levels of noise to the individual channels, it is preferable to adjust the optical power level using not amplifiers but attenuators.

The multiplexer 22 combines the channels input from an end thereof using a wavelength multiplexing scheme, and outputs a multiple wavelength signal from the other end thereof. In the example shown in FIG. 1, all the channels of the output optical signal are optically amplified by the optical amplifier 24.

The branch node 32 sends a part of the optical signal propagating through the transmission line 12 to the optical spectrum analyzer. The branch node 32 may be a node dedicated for branching, an add/drop node, or a coupler.

The optical spectrum analyzer 34 analyzes the spectrum of the optical signal propagating through the transmission line 12, and outputs optical spectrum information. Thus characteristics of the optical signal are extracted. While the optical signal at the input side of the repeater is input to the optical spectrum analyzer 34 in the example shown in FIG. 1, an optical signal at the output end may alternatively be input to the optical spectrum analyzer 34. From the standpoint of analyzing an optical signal with influence of optical noise introduced in the repeater, it is preferable to analyze the optical signal at the output end. However, if a number of repeaters are provided on the transmission line 12, there might be little advantage in differentiating between input sides and output sides of the repeaters.

The transmission scheme monitor 36 identifies transmission schemes of the individual channels contained in the optical signal based on the optical spectrum information as described below.

The adjustment amount controlling part 38 determines adjustments necessary for each of the channels based on the transmission schemes of the channels determined by the transmission scheme monitoring part 36 and the optical spectrum information as described below. The determination result is reported in the form of a control signal to adjusting elements (the variable attenuators in the example shown in FIG. 1) of the adjusting part 20. The adjusting elements adjust the optical power level according to the control signal.

Figure 2:
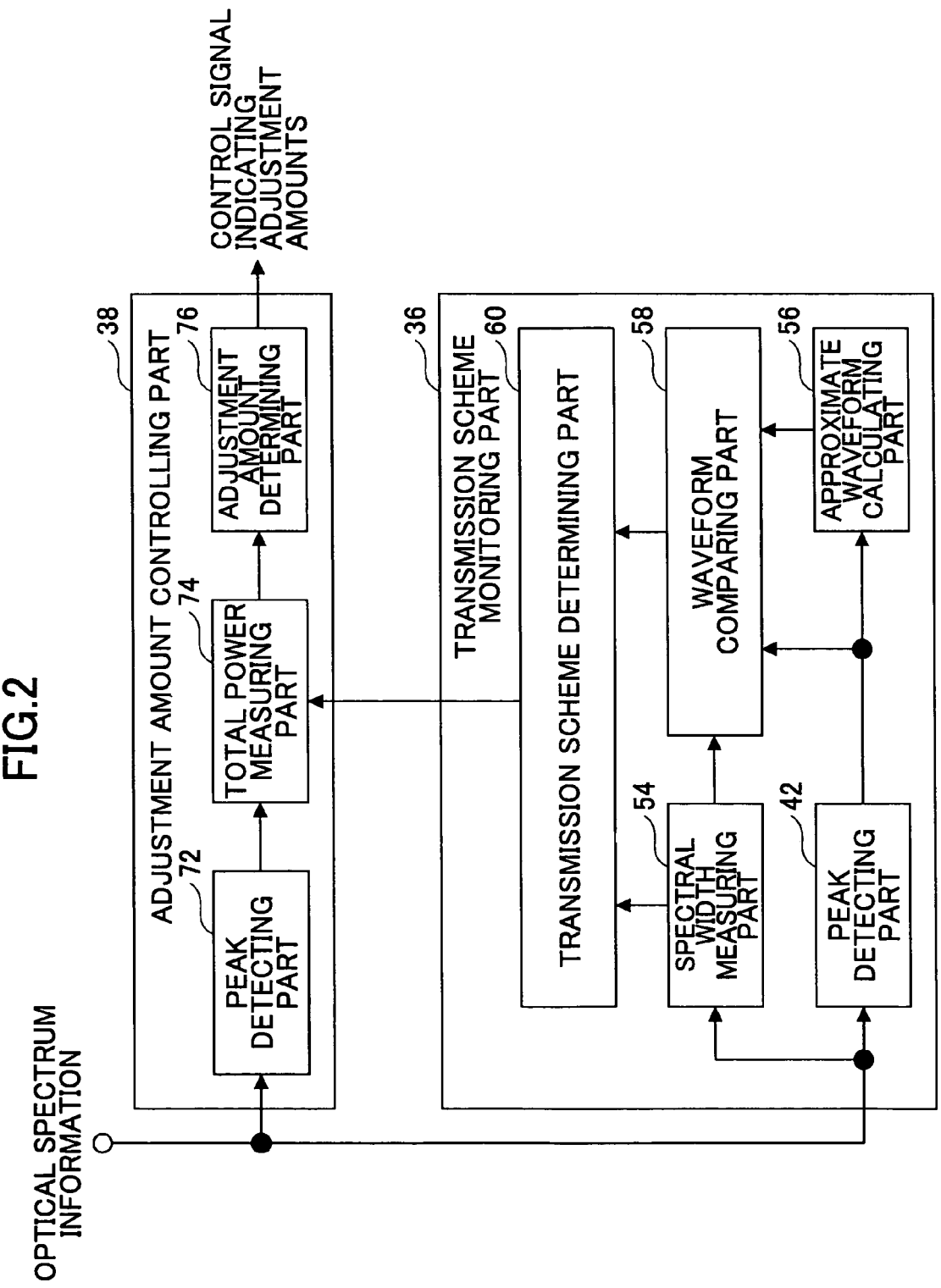
FIG. 2 is a detailed block diagram showing a monitoring part and an adjustment amount controlling part.

FIG. 2 is a detailed block diagram showing the transmission scheme monitoring part 36 and the adjustment amount controlling part 38. The transmission scheme monitoring part 36 shown in FIG. 2 comprises a peak detecting part 52, a spectral width measuring part 54, an approximate waveform calculating part 56, a waveform comparing part 58, and a transmission scheme determining part 60. The adjustment amount controlling part 38 shown in FIG. 2 comprises a peak detecting part 72, a total power measuring part 74, and an adjustment amount determining part 76.

The peak detecting parts 52 and 72 detect the peak of each channel based on the optical spectrum information. The peak detecting parts 52 and 72 may be provided as separate elements as shown in FIG. 2, or may be integrated as one element.

The spectral width measuring part 54 measures the spectral width of the waveform of each channel, and outputs the measurement result to the transmission scheme determining part 60. The spectral width is typically measured in terms of full width at half maximum (FWHM), but may be measured in other terms as long as the degree of wavelength dispersion of the optical power (width of the waveform) can be evaluated.

The approximate waveform calculating part 56 calculates a curve that approximates the waveform obtained from the optical spectrum information (i.e., performs fitting). The peaks of the waveform are removed for fitting. In other words, the approximate waveform calculating part 56 calculates an approximate curve that approximates a waveform resulting from removing peak data from the raw (unprocessed) waveform obtained from the spectrum information. Use of the approximate curve is described below.

The waveform comparing part 58 compares the actual waveform with the peaks with the calculated approximate curve, and outputs the comparison result to the transmission scheme determining part 60.

The transmission scheme determining part 60 determines transmission schemes (modulation schemes and bit rates) of the individual channels contained in the optical signal based on their spectral widths and the comparison result from the waveform comparing part 58.

The total power measuring part 74 of the adjustment amount controlling part 38 measures total power levels of the individual channels based on their peak values. The total power can be measured by integrating the waveform of each channel in a wavelength range containing the peak value. The total power levels are set to the same value when transmitted.

However, the total power levels measured based on the peak values include noise and the like of the optical amplifier. For calculating the total power levels more accurately, the total power measuring part 74 measures the total power levels based on the transmission schemes determined by the transmission scheme monitoring part 36 as well as the peak values.

The adjustment amount determining part 76 determines adjustment amounts to be applied to the individual channels based on the calculated total power levels.

Figure 3:
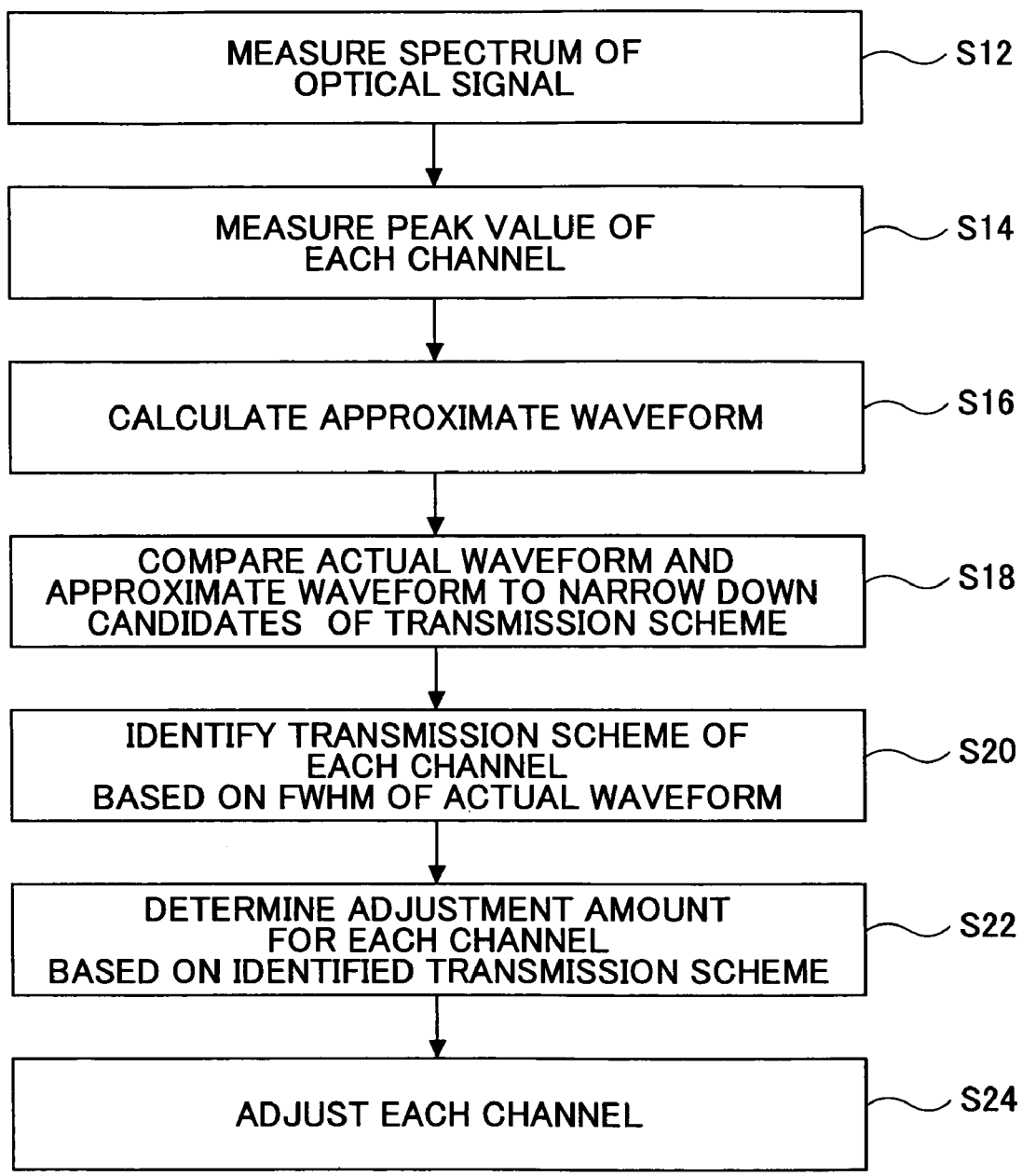
FIG. 3 is a flowchart showing a procedure of determining the adjustment amount of optical power according to an embodiment.
Figure 4:
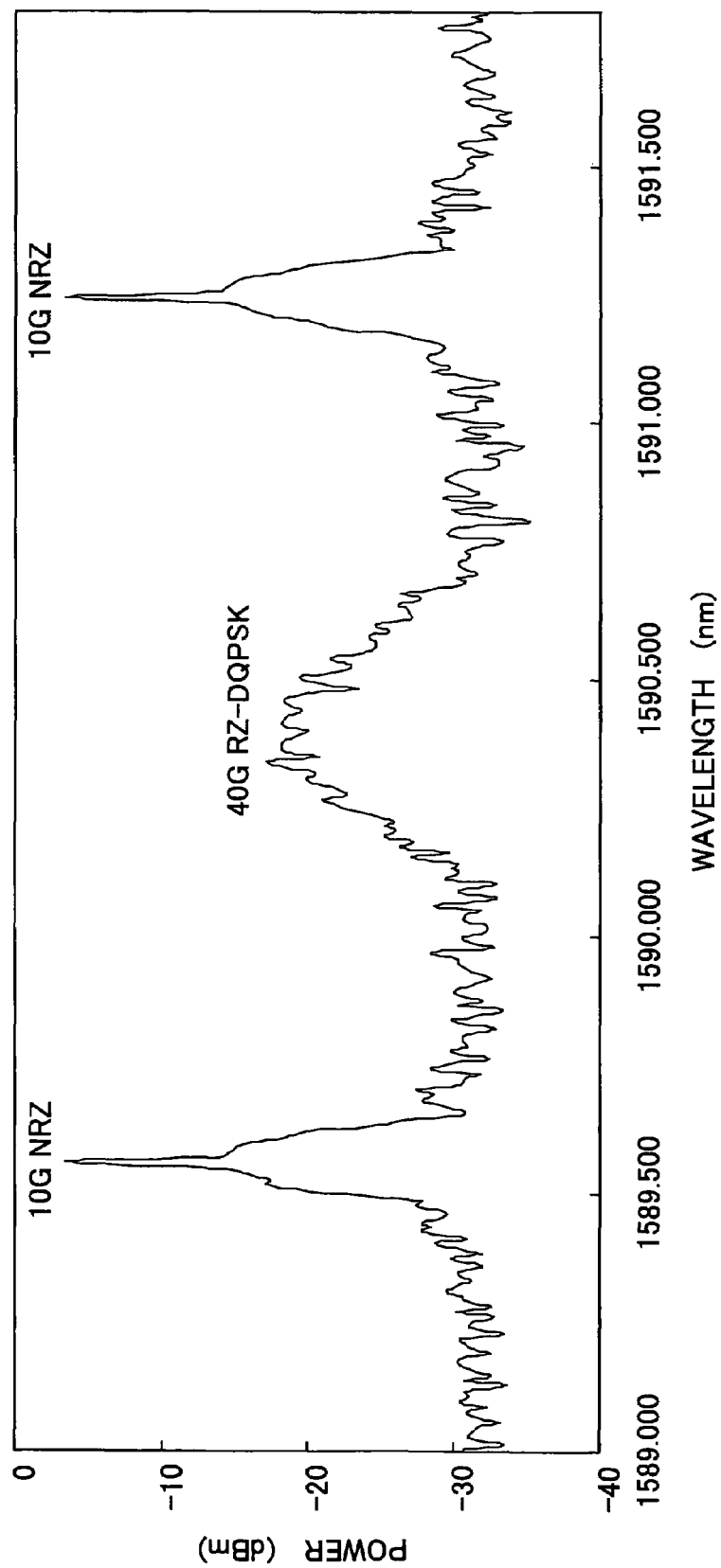
FIG. 4 shows an example of a measurement result of a multiple wavelength signal.

FIG. 3 is a flowchart showing a procedure of determining the adjustment amount of optical power according to an embodiment of the present invention. In Step S12, the optical spectrum analyzer 34 measures the spectrum of an optical signal. The measurement result is output as spectrum information to the transmission scheme monitoring part 36 and the adjustment amount controlling part 38. FIG. 4 shows an example of the measurement result. In the example shown in FIG. 4, three channels are multiplexed in the optical signal. Transmission schemes of these three channels are, for example, as follows:

Channel 1 (CH1): 10 bps-NRZ (non-return-to-zero)

Channel 2 (CH2): 40 Gbps-RZ-DQPSK (differential QPSK)

Channel 3 (CH3): 10 Gpbs-NRZ

In step S12, although waveforms of the channels have already been determined, the transmission schemes of the channels have not been determined yet.

In Step 14 of FIG. 3, the peak value (and the peak position) of each channel is measured. As shown in FIG. 4, the channels 1 and 3 using the same transmission scheme should have the peaks of the same level. On the other hand, the waveform of channel 2 is different from the waveforms of channels 1 and 3 due to the difference of the transmission scheme. Accordingly, channel 2 does not need to have the peak at the same level as the waveforms of channels 1 and 3. That is, if channels of different transmission schemes are multiplexed as in this example, the repeater cannot perform appropriate compensation only by comparing peak data.

Figure 5:
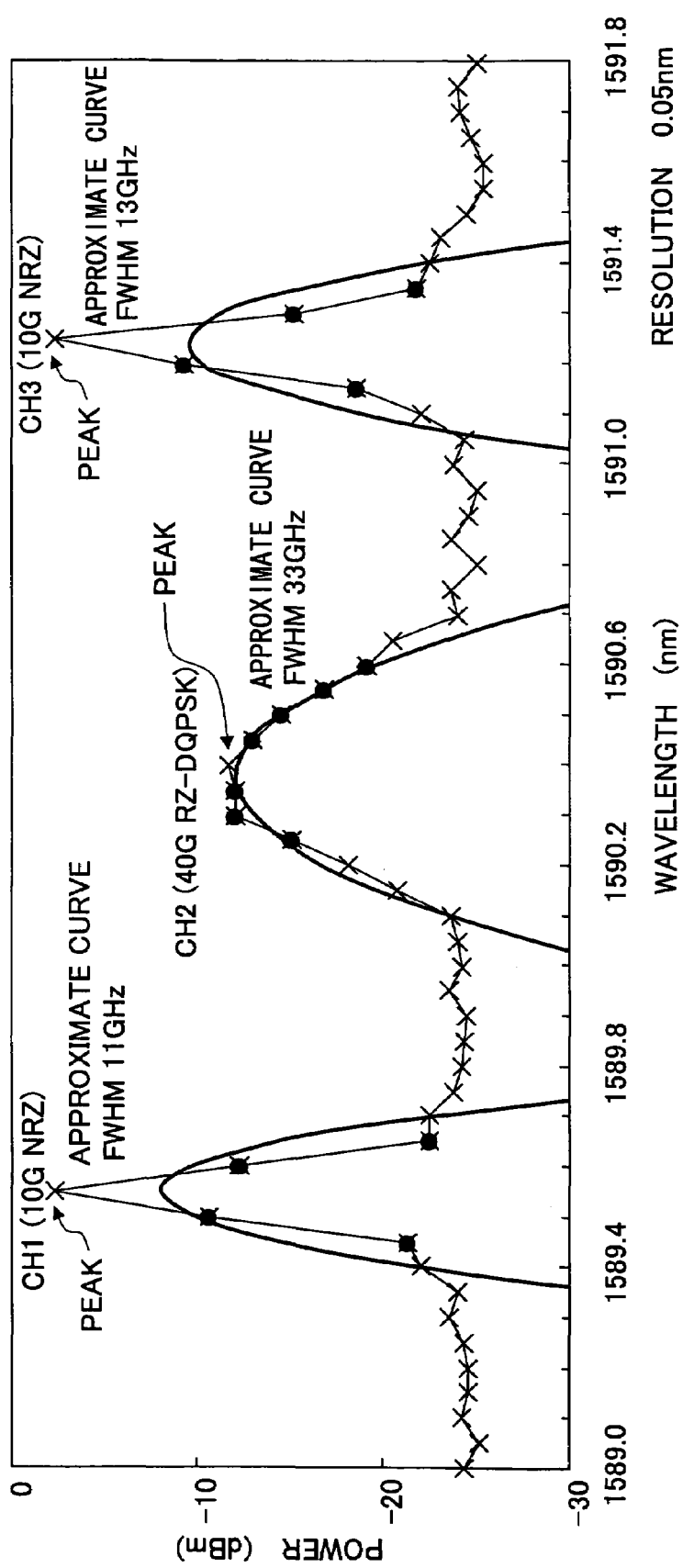
FIG. 5 is a graph showing an actual waveform and an approximate waveform.

In Step S16, a curve that approximates the waveform of each channel is calculated. More specifically, the peak of the waveform (actual waveform) obtained from the spectrum is removed, and then a curve that approximates the waveform with the peak removed is calculated. The approximate curve may include any suitable types of curves (including broken lines). For example, the approximate curve may have a single extremum in a certain wavelength range containing a wavelength that forms the peak (which is to be removed), or may be a quadratic curve. The certain wavelength range may be defined by the total power. FIG. 5 shows actual waveforms and the approximate waveforms of the channels 1 through 3 according to this embodiment. The actual waveforms are plotted with × marks, while the approximate curves are plotted with ● marks.

In Step S18 of FIG. 3, the actual waveform and the approximate waveform are compared so as to narrow down candidates for the transmission scheme of each channel.

In Step S20, the candidates for the transmission scheme of each channel are narrowed down based on the FWHM of the actual waveform. The FWHM of the approximate curve may alternatively be used. With the operations in Step S18 and S20, the transmission scheme of each channel is identified. Although Step S18 is followed by Step S20 for ease of explanation in the above description, this is not required for the present invention. The order of these steps may be reversed. Further, a part or all the process of Step S18 may be performed in parallel and simultaneously with the process of Step S20.

Figure 7:
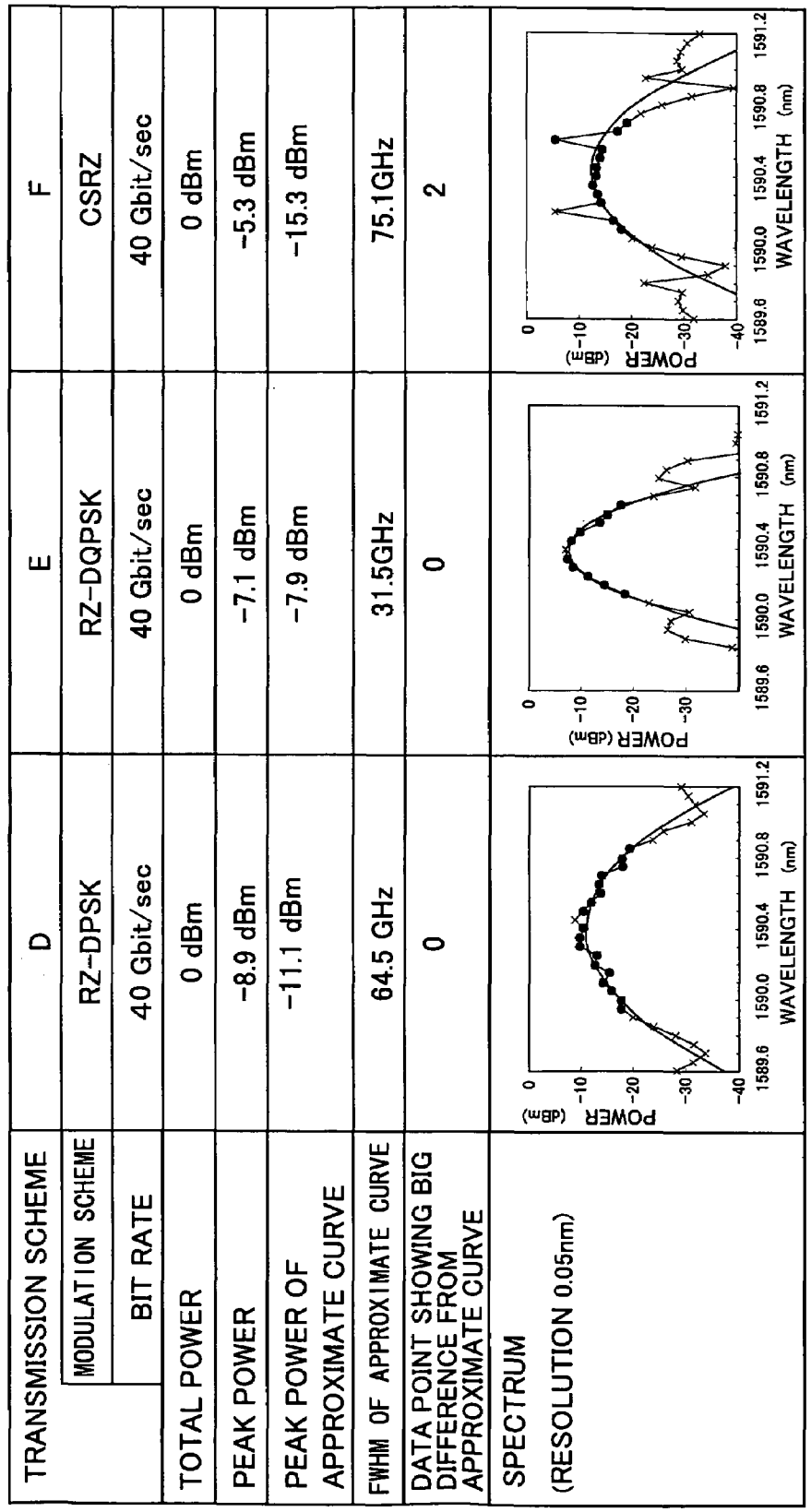

There is a predetermined relationship between transmission schemes (modulation scheme and bit rate) and waveforms. FIGS. 6 and 7 show actual waveforms (i.e. accurately simulated waveforms) and approximate waveforms (approximate waveforms of the actual waveforms with their peaks removed) of various transmission schemes A through F. The approximate waveforms are represented by quadratic curves with upward convexities. In FIGS. 6 and 7, the total power (dBm), the peak power of the actual waveform (dBm), the peak power of the approximate waveform (dBm), the FWHM, and the number of data points showing a significant difference between the actual waveform and the approximate waveform of each transmission scheme are shown.

In the transmission schemes A, B, and F, a sharp peak is formed due to an intensity modulation scheme. Accordingly, there is a data point showing a significant difference between the approximate waveform of the actual waveform with its peak removed and the actual waveform. In the transmission schemes C, D, and E, there is no data point showing such a significant difference. That is, if there is a data point showing a significant difference between the actual waveform and the approximate waveform, the modulation scheme is determined to be NRZ, CSRZ, or the like. If there is no data point showing a significant difference, the modulation scheme is determined to be RZ-DPSK, RZ-DQPSK, or the like.

The transmission schemes A and B employ the same modulation scheme (NRZ), but the bit rate of the transmission scheme B is four times greater than the bit rate of the transmission scheme A. Accordingly, the transmission scheme B requires a band (37.1 GHz) four times higher than the band (9.8 GHz) required by the transmission scheme A. The transmission scheme D and E have the same bit rate, but there is a two-times difference in the number of modulation levels. Accordingly, the transmission scheme E requires a band (31.5 GHz) about two times less than the band (64.5 GHz) required by the transmission scheme D.

Following are some of the characteristics of the transmission schemes.

(A) In the transmission scheme A, the FWHM of the approximate curve is about 10 GHz.

(B) In the transmission scheme B, there is a data point showing a big difference between the approximate curve and the actual curve.

(C) In the transmission scheme C, there is no data point showing a big difference between the approximate curve and the actual curve, and the FWHM is about 20 GHz.

(D) In the transmission scheme D, there is no data point showing a big difference between the approximate curve and the actual curve, and the FWHM is about 60 GHz.

(E) In the transmission scheme E, there is no data point showing a big difference between the approximate curve and the actual curve, and the FWHM is about 30 GHz.

(F) In the transmission scheme F, there are two data points showing a big difference between the approximate curve and the actual curve.

These predetermined relationships between the transmission schemes and the waveforms have been researched in advance, and may be stored in a memory (not shown) of the repeater. The transmission scheme of each channel is identified by referring to these relationships. The identified transmission scheme is output from the transmission scheme monitoring part 36 to the adjustment amount controlling part 38.

In the example shown in FIGS. 4 and 5, each of the channels 1 and 3 has a data point showing a significant difference and has a FWHM of about 10 GHz. Therefore, it is determined that the modulation scheme of the channels 1 and 3 is NRZ and the bit rate is 10 bps. The channel 2 does not have a data point showing a significant difference and has a FWHM of about 40 GHz. Therefore, it is determined that the modulation scheme of the channel 2 is RZ-DQPSK and the bit rate is 40 Gbps.

Figures 8, 9:
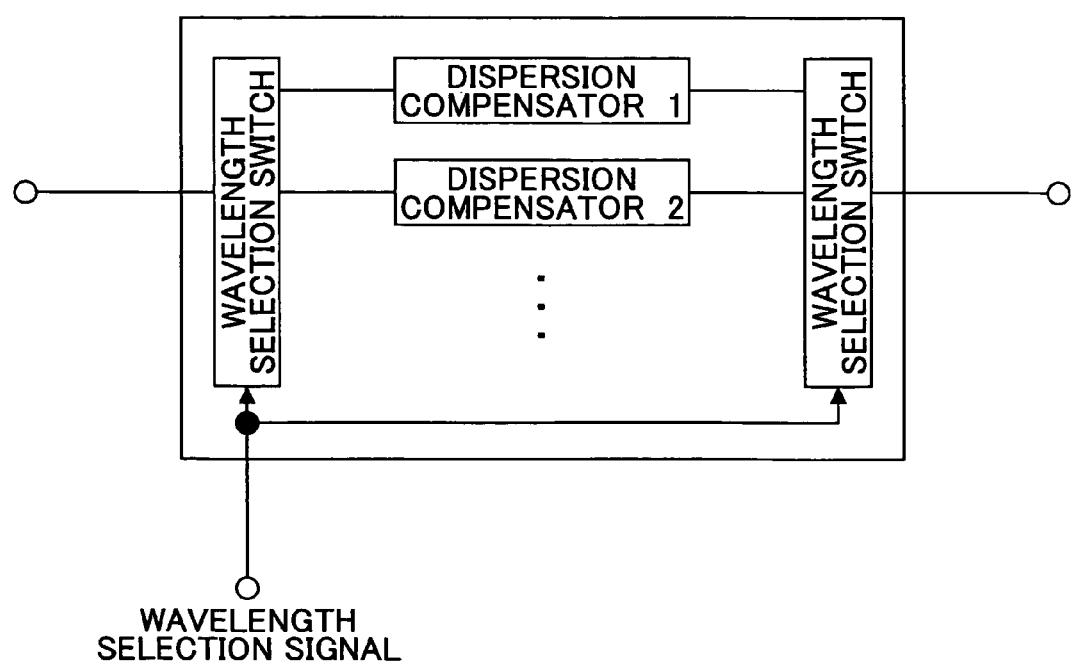
FIG. 8 is a table showing predetermined relationships between transmission schemes and peak values.
FIG. 9 is a block diagram showing an example of an element for dispersion compensation.

In Step S22 of FIG. 3, the adjustment amount for each channel is determined based on the identified transmission scheme. The adjustment amount may be determined based on predetermined relationships between transmission schemes and peak values. These relationships may be stored in the memory. FIG. 8 shows examples of the predetermined relationships. It is more common to include values of total power levels in the predetermined relationships. However, since the total power levels of the channels are 0 dBm in this embodiment, the values of total power levels are not shown in FIG. 8. Definitions of the transmission schemes A through F are the same as those shown in FIGS. 6 and 7. These relationships are referred to so as to find the peak value corresponding to the identified transmission scheme. Signal optical power of each channel is evaluated based on the peak value, and a control signal is generated based on the signal optical power. The adjusting elements of the adjusting part 20 can adjust the optical power level of the corresponding channels contained in the actual optical signal according to this control signal.

In Step S24, the optical power level of each channel is adjusted according to the control signal. Then, the adjusted channels are multiplexed by the multiplexer 22, so that a multiple wavelength signal propagates through the optical fiber.

Embodiment 2

If transmission schemes differ, properties of optical signals such as noise tolerance, dispersion tolerance, and nonlinear tolerance also differ. Therefore, not only the optical power level of each channel but also the dispersion compensation system may be changed based on wavelengths (channels) and transmission schemes.

FIG. 9 shows an example of a compensating element for performing various dispersion compensations. This compensating element is provided one for each channel and disposed between the demultiplexer 18 and the multiplexer 22. Wavelength selection switches select predetermined wavelengths according to instructions, and output the predetermined wavelengths. Dispersion compensators 1, 2, perform dispersion compensation in different compensation systems. The dispersion compensator 1, the dispersion compensator 2, are provided as options of dispersion compensation systems for each of the channels, and one of the compensation systems (the most suitable compensation system) is applied to each of the channels according to a wavelength selection signal. Content of the wavelength selection signal can be determined based on the transmission scheme identified by the transmission scheme monitoring part 36. Thus, not only adjustments of optical power levels suitable for the individual channels are performed, but also dispersion compensation systems suitable for the individual channels can be selected.

The present application is based on Japanese Priority Application No. 2006-053228 filed on Feb. 28, 2006, with the Japanese Patent Office, the entire contents of which are hereby incorporated by reference.

What is claimed is:

1. A repeater that transmits an optical signal using wave division multiplexing, comprising:
    a demultiplexing unit that separates a plurality of channels contained in the optical signal;
    an adjusting unit that adjusts at least optical power of each of the channels according to a control signal;
    a multiplexing unit that outputs a multiple wavelength signal in which the channels are multiplexed; and
    a monitoring unit that determines a modulation scheme and a bit rate of the optical signal for each of the channels,
    wherein the monitoring unit includes a memory unit that stores relationships between the modulation schemes, the bit rates, peak values, and optical power integration values, and the monitoring unit generates the control signal for the modulation scheme and the bit rate of the optical signal for each of the channels, the modulation scheme and the bit rate being determined by referring to the predetermined relationships stored in the memory unit.

2. The repeater as claimed in claim 1, wherein the adjusting unit includes an attenuator that attenuates the optical power.

3. The repeater as claimed in claim 1, wherein the adjusting unit includes
    a wavelength selection switching unit that selects one of the channels according to a control signal; and
    a unit that performs predetermined dispersion compensation on the channel selected by the wavelength selection switching unit.

4. The repeater as claimed in claim 1, wherein the monitoring unit includes
    a unit that detects peaks of the optical signal and calculates an approximate waveform that represents the optical signal with the peaks removed; and
    a unit that compares a waveform with the peaks and the approximate waveform so as to determine a candidate for the modulation scheme and a candidate for the bit rate of each of the channels.

5. The repeater as claimed in claim 4, wherein the approximate waveform is represented by a curve with a single extremum in a predetermined wavelength range.

6. The repeater as claimed in claim 5, wherein the approximate waveform is represented by a quadratic curve.

7. The repeater as claimed in claim 1, wherein the monitoring unit includes a unit that measures spectral widths of the optical signal and determines a candidate for the modulation scheme and a candidate for the bit rate of each of the channels.

8. The repeater as claimed in claim 1, wherein the modulation schemes of the channels are intensity modulation or phase modulation.

9. The repeater as claimed in claim 8, wherein the modulation schemes of the channels are any one of NRZ, RZ, duobinary, and PSK.

10. The repeater as claimed in claim 1, wherein the bit rates of the channels are 10 Gbps or 40 Gbps.

11. A repeating method implemented in a repeater for transmitting an optical signal using wave division multiplexing, comprising:
    separating, by a demultiplexing unit of the repeater, a plurality of channels contained in the optical signal;
    adjusting, by an adjusting unit of the repeater, at least optical power of each of the channels according to a control signal; and
    outputting, by a multiplexing unit of the repeater, a multiple wavelength signal in which the channels are multiplexed; and
    determining, by a monitoring unit of the repeater, a modulation scheme and a bit rate of the optical signal for each of the channels,
    wherein the monitoring unit includes a memory unit that stores relationships between the modulation schemes, the bit rates, peak values, and optical power integration values, and the monitoring unit generates the control signal for the modulation scheme and the bit rate of the optical signal for each of the channels, the modulation scheme and the bit rate being determined by referring to the predetermined relationships stored in the memory unit.

* * * * *